United States Patent [19]
Hartlove et al.

[11] Patent Number: 5,974,072
[45] Date of Patent: Oct. 26, 1999

[54] HIGH ENERGY AIRBORNE COIL LASER

[75] Inventors: Jeffrey S. Hartlove; Charles W. Clendening, Jr., both of Torrance; Robert J. Day, Rolling Hills Estates; Gary C. Koop, Manhattan Beach, all of Calif.

[73] Assignee: TRW Inc., Redondo Beach, Calif.

[21] Appl. No.: 09/009,617

[22] Filed: Jan. 20, 1998

Related U.S. Application Data

[63] Continuation of application No. 08/890,714, Jul. 9, 1997, abandoned.

[51] Int. Cl.⁶ .............................. H01S 3/095; F41B 15/00
[52] U.S. Cl. ................................ 372/89; 372/55; 372/90; 372/97; 372/109; 89/1.11
[58] Field of Search ............................. 372/55, 89, 90, 372/97, 98, 109; 89/1.11

[56] References Cited

U.S. PATENT DOCUMENTS

| | | | |
|---|---|---|---|
| 3,863,176 | 1/1975 | Martinez et al. | 372/89 X |
| 4,466,100 | 8/1984 | Broadwell | 372/89 |
| 4,558,451 | 12/1985 | McDermott et al. | 372/89 |
| 4,643,889 | 2/1987 | Uchiyama et al. | 372/89 X |
| 4,653,062 | 3/1987 | Davis et al. | 372/89 |
| 4,668,498 | 5/1987 | Davis | 372/89 X |
| 4,780,880 | 10/1988 | Dickerson | 372/89 X |
| 5,198,607 | 3/1993 | Livingston et al. | 89/1.11 |
| 5,199,041 | 3/1993 | Schmiedberger et al. | 372/89 |
| 5,417,928 | 5/1995 | McDermott | 372/89 X |
| 5,516,502 | 5/1996 | Dickerson | 372/89 X |
| 5,870,422 | 2/1999 | Florentino et al. | 372/89 |
| 5,883,916 | 3/1999 | Lohn et al. | 372/89 |

*Primary Examiner*—Brian Healy
*Attorney, Agent, or Firm*—Michael S. Yatsko

[57] ABSTRACT

A high energy chemical laser capable of being operated in an aircraft to interdict and destroy theater ballistic missiles is provided. A key to the chemical laser of the invention is the use of individual chemical lasers whose individual photon energy outputs can be combined into a single high-energy laser beam.

26 Claims, 10 Drawing Sheets

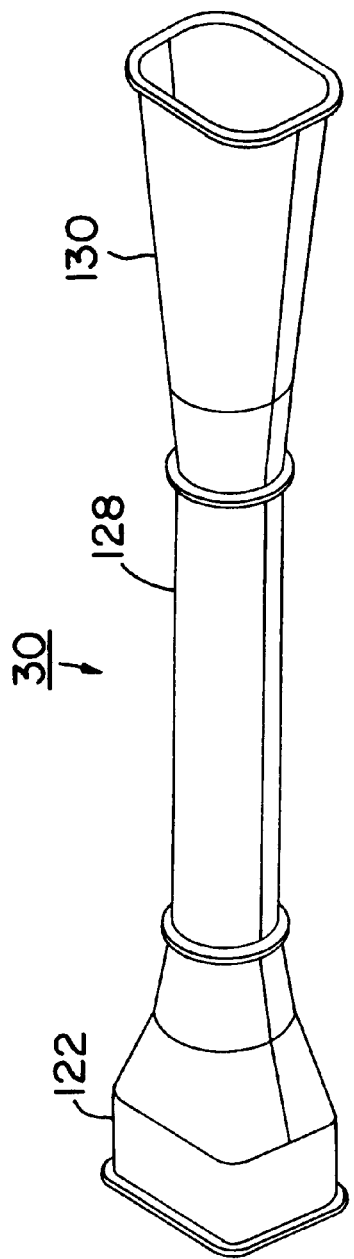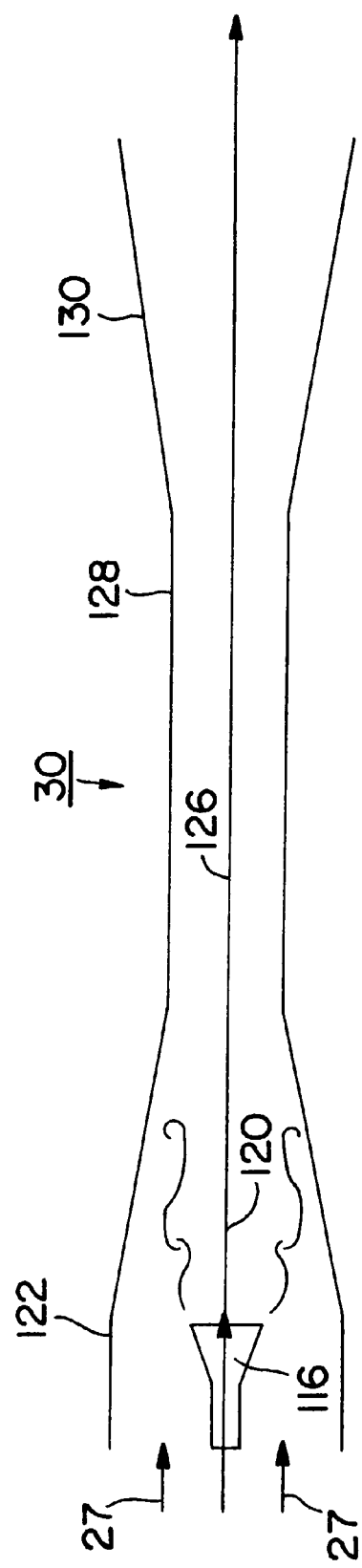
FIG. 9
FIG. 10

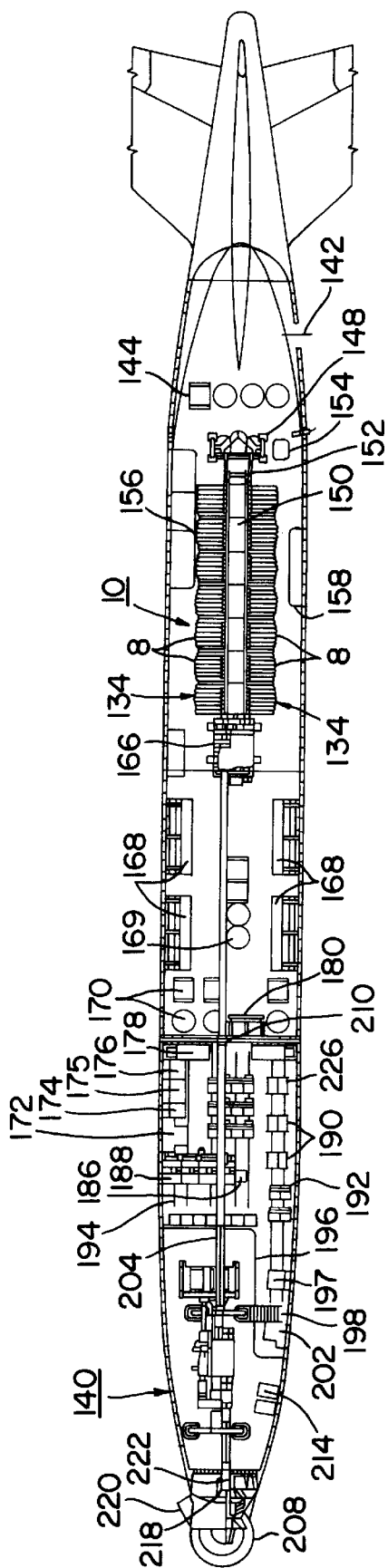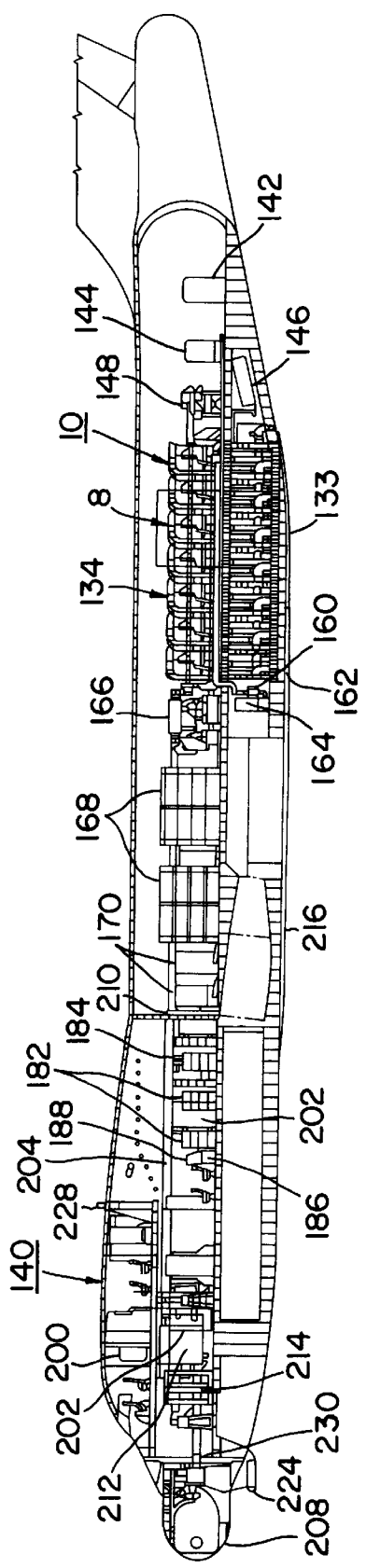

HIGH ENERGY AIRBORNE COIL LASER

This is a continuation of U.S. patent application Ser. No. 08/890,714, filed on Jul. 9, 1997, now abandoned.

FIELD OF THE INVENTION

This invention relates generally to chemical lasers and, specifically, to high energy chemical oxygen iodine lasers.

BACKGROUND

The development of an effective defense against theater ballistic missiles is an important national defense requirement. Experience gained during the Desert Storm War highlighted the critical importance of providing an adequate defense against theater ballistic missiles.

Research has shown that an effective anti-theater ballistic missile system is theoretically possible if a high energy laser beam can be directed at theater ballistic missiles during the brief period between missile launch and booster rocket burn-out. It is during this short interval when theater ballistic missiles are most readily identified and most vulnerable to a high energy laser beam.

Prior art anti-theater ballistic missile weapons lack the capability to interdict theater ballistic missiles before booster rocket burn-out, and have therefore proven to be largely ineffective in destroying even the current generation of theater ballistic missiles.

Accordingly, there is a need for an anti-theater ballistic missile system capable of interdicting theater ballistic missiles during the short period of time between missile launch and booster rocket burn-out.

SUMMARY

The invention satisfies this need. The invention is a high energy chemical laser installable in an airborne anti-theater ballistic missile system. To be installable on an airborne platform, the chemical laser comprises a bank of two or more individual photon generating modules, each module having a distinct photon generating chamber. Each of the photon generating chambers, however, are optically interconnected by a common optical cavity so that total photon output of the chemical laser is the sum of the photon outputs from each of the photon generating modules.

In a preferred embodiment, the chemical laser is a chemical oxygen iodine laser ("COIL"). The COIL has a singlet-delta oxygen generating section, photon generating chamber and pressure recovery section, all specially designed to maximize efficiency and minimize size and weight.

The invention has been found to provide an effective anti-theater ballistic missile system capable of interdicting and destroying theater ballistic missiles within the short period of time between missile take-off and booster rocket burn-out.

DRAWINGS

These features, aspects and advantages of the present invention will become better understood with regard to the following description, appended claims and accompanying figures where:

FIG. 9 is a perspective view of an ejector useable in the invention;

FIG. 10 is a cross-sectional side view of another ejector useable in the invention;

FIG. 12 is a plan view in partial cross-section showing a chemical oxygen iodine laser mounted in a aircraft having features of the invention;

FIG. 13 is a side view in partial cross-section of the aircraft-mounted chemical oxygen iodine laser illustrated in FIG. 12.

DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a high power chemical laser suitable for use in an airborne and-theater ballistic missile system. A fundamental characteristic of the chemical laser of the invention is that it is comprised of a bank of two or more individual photon generating modules, each module having a distinct photon generating chamber. All of the photon generating chambers from all of the photon generating modules are optically connected by a common optical cavity so that the total photon output of the chemical laser is the sum of the photon outputs from each of the photon generating modules. Use of a common optical cavity also assures coherent optical output.

By building the chemical laser from individual modules, an otherwise bulky chemical laser can be installed in a highly confined environment. Moreover, building the chemical laser from individual modules greatly facilitates maintenance and provides for graceful performance degradation module by module. Accordingly, by building the chemical laser from individual modules, a high power chemical laser can, for the first time, be effectively mounted and operated aboard an airborne platform.

In a preferred embodiment of the invention, the chemical laser is a chemical oxygen iodine laser, also known as a "COIL." The basic operation of a COIL is generally known in the art and is specifically described in co-pending U.S. patent application Ser. Nos. 08/762,180, now U.S. Pat. No. 5,859,363, and 08/890,717, pending (entitled "Water Vapor Trap and Liquid Separator for Singlet-Delta Oxygen Generator," filed concurrently herewith) both of which are incorporated herein by this reference.

Figure 1:
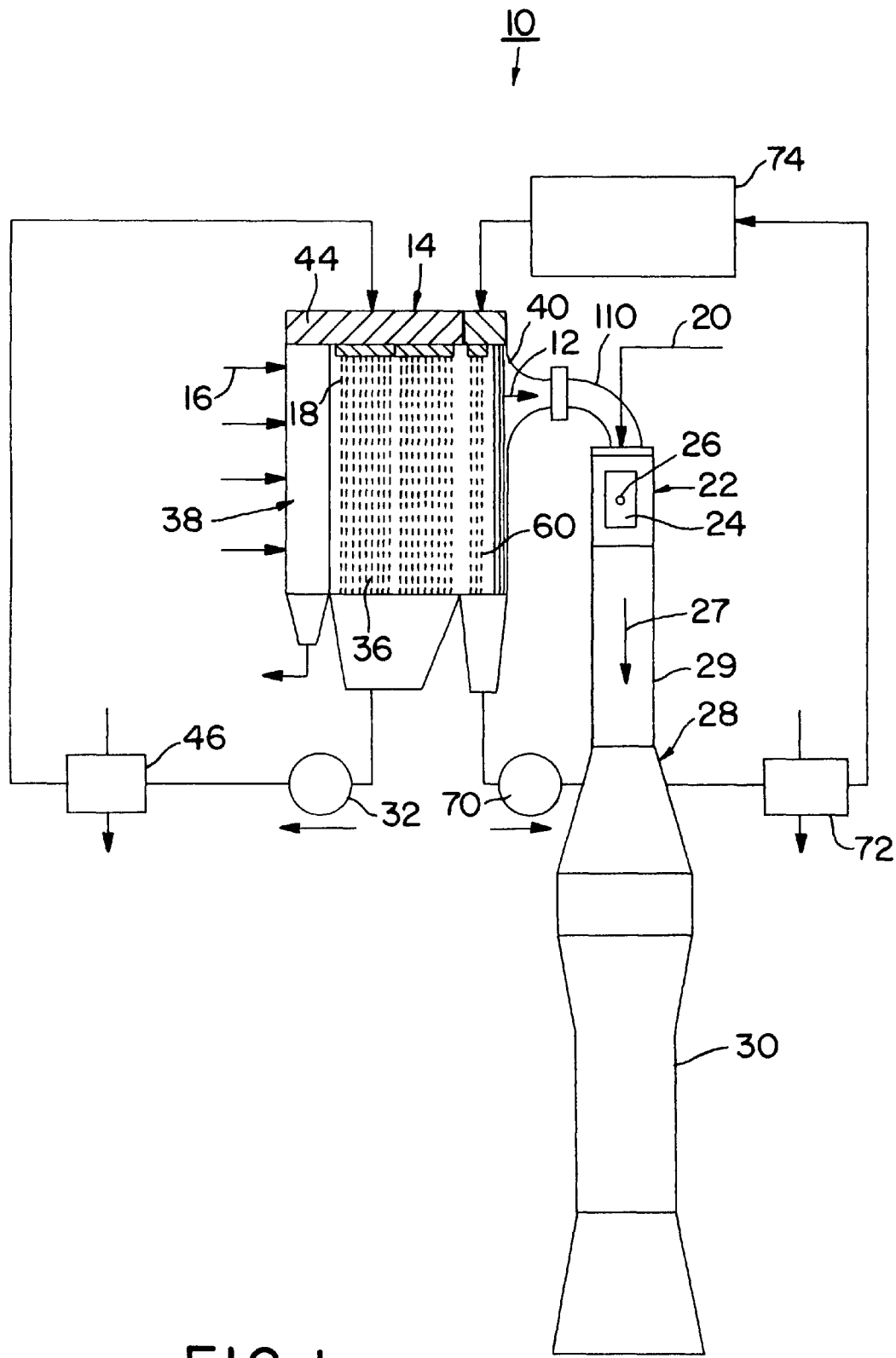
FIG. 1 is a flow diagram showing a chemical oxygen iodine laser having features of the invention.

Referring to FIG. 1, in an individual photogenerating module 8 of a COIL of the invention 10, singlet-delta oxygen 12 is produced in a singletdelta oxygen generator 14 by a reaction of chlorine gas 16 with basic hydrogen peroxide 18. The singlet-delta oxygen 12 is reacted with iodine 20 in a photon generating chamber 22 to produce electronically excited iodine. As the electronically excited iodine returns to its natural state, high energy photons are released. These photons are captured, focused, and then directed via a common optical cavity 24 along a laser beam path 26 to be joined by the photon beams generated by other photon generating modules 8.

The photon generating chamber 22 is operated at reduced pressure. Accordingly, the effluent 27 from the photon generating chamber 22 must be drawn from the photon generating chamber 22 by a pressure recovery system 28. In the invention, the pressure recovery system 28 comprises a diffusion chamber 29 and a plurality of single stage ejectors 30.

Figure 2:
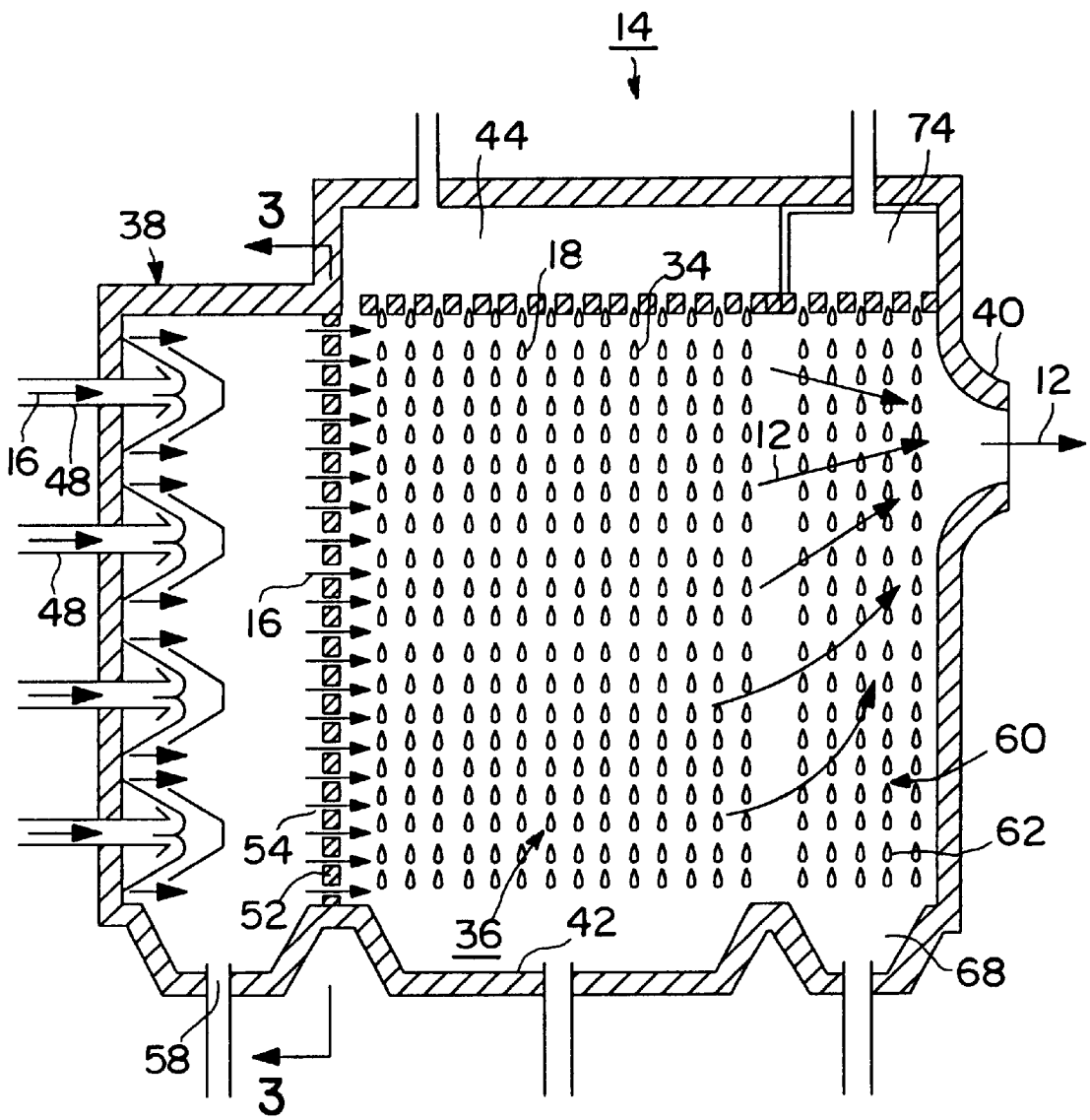
FIG. 2 is a cross-sectional side view of a singlet-delta oxygen generator having features of the invention.
Figure 3:
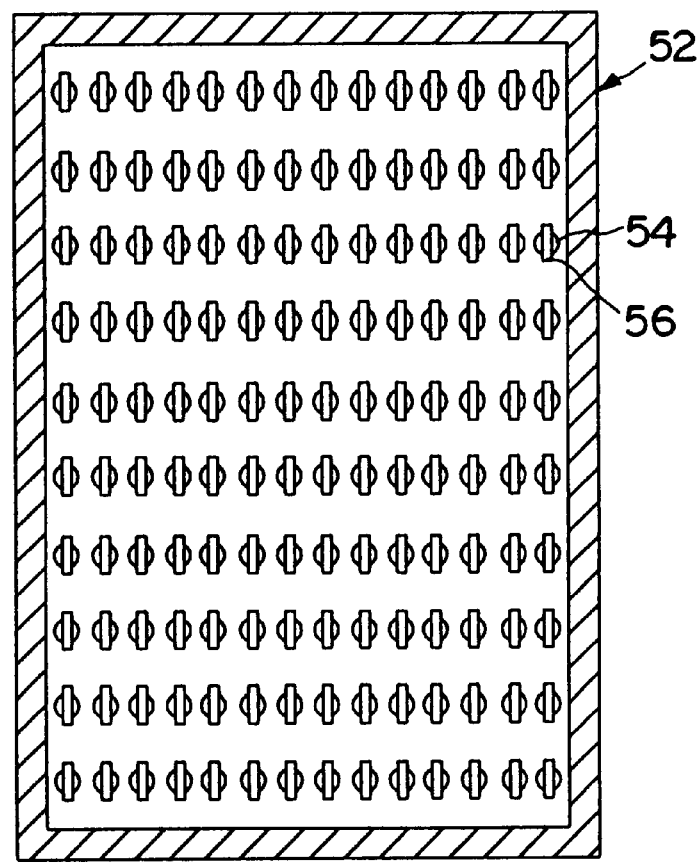
FIG. 3 is the front view of a distribution plate useable in the singletdelta oxygen generator shown in FIG. 2, taken along line 3—3.
Figure 4:
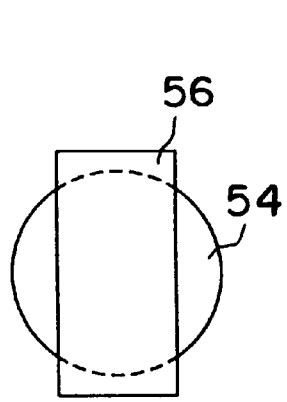
FIG. 4 is a detail view of a hole and impingement plate useable in the distribution plate shown in FIG. 3.
Figure 5:
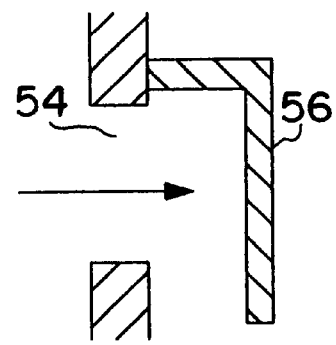
FIG. 5 is a cross-sectional side view of the hole and impingement plate illustrated in FIG. 4.

A preferred singlet-delta oxygen generator 14 useable in the invention is shown generally in FIG. 2. Chlorine gas 16, typically diluted with helium or other inert gas, is flowed from a chlorine distribution chamber 38 and contacted with basic hydrogen peroxide 18 under conditions well-known in the art to produce singlet-delta oxygen molecules 12. A preferred singlet-delta oxygen generator 14 useable in the invention is described in U.S. Pat. No. 5,392,988, the entirety of which is incorporated herein by this reference. In such a singlet-delta oxygen generator 14, the basic hydrogen peroxide 18 is introduced into the generator 14 as highly uniform droplets 34 having a nominal diameter between about 300 and 400 microns. These droplets 34 form a falling droplet zone 36 within the generator 14. Chlorine gas 32 is introduced from a chlorine distribution chamber 38 into the falling droplet zone 36. The chlorine gas 16 is directed horizontally, transverse to the downwardly falling droplets 34. A resulting stream containing singlet-delta oxygen 12 is extracted from a singlet-delta oxygen outlet nozzle 40 disposed opposite to the chlorine distribution chamber 38.

The basic hydrogen peroxide 18 is removed via a basic hydrogen peroxide catch basin 42 at the bottom of the singlet-delta oxygen generator 14 and is pumped by a basic hydrogen peroxide pump 32 back to a droplet generator 44 at the top of the singlet-delta oxygen generator 14. Typically, the recycled basic hydrogen peroxide 18 is cooled in a basic hydrogen peroxide heat exchanger 46.

The particular make-up of the basic hydrogen peroxide solution 18 is chosen so as to allow the repeated recycling of the solution 18 with only gradual decrease in singlet-delta oxygen production. One preferred basic hydrogen peroxide solution 18 is described in U.S. patent application Ser. No. 08/762,180, the entirety of which is incorporated herein by this reference. In U.S. patent application Ser. No. 08/762, 180, there is described a basic hydrogen peroxide solution 18 comprising at least two different bases in molar ratios to one another of between about 3:1 and about 1:1. In a preferred embodiment of that solution 18, the solution 18 comprises sodium hydroxide, potassium hydroxide and lithium hydroxide. Such preferred basic hydrogen peroxide solutions 18 have been found to have significant increased efficiency over prior art basic hydrogen solutions because of their decreased propensity for forming insoluble salts, thereby allowing the continued utilization of a very high percentage of the hydrogen peroxide 18 in the generation of singlet-delta oxygen. The use of such a preferred basic hydrogen peroxide solution 18 significantly lengthens the ability of an airborne anti-theater ballistic missile system to remain on station. Such preferred basic hydrogen peroxide solutions 18 also have been found to exhibit consistently low viscosity characteristics.

In another preferred embodiment of a singlet-delta oxygen generator 14 useable in the invention, novel chlorine distribution equipment described in co-pending U.S. patent application Ser. No. 08/890,715 (entitled "Improved Singlet-Delta Oxygen Generator," filed concurrently herewith and incorporated herein in its entirety by this reference), pending, is used to provide a singlet-delta oxygen generator 14 of higher efficiency than prior art singlet-delta oxygen generators. By such novel chlorine distribution equipment, liquid carry-over from the chlorine distribution chamber 38 is minimized and more uniform chlorine distribution into the falling droplet zone 36 is provided. Such novel chlorine distribution equipment is shown in FIGS. 2–5.

Chlorine 16 is delivered into the chlorine distribution chamber 38 by chlorine inlet conduits 48 which direct the incoming flow of chlorine 16 to impinge against a sidewall 50 of the chlorine distribution chamber 38 disposed opposite a chlorine distribution plate 52. By directing the influx of chlorine 16 into the chlorine distribution chamber 38 in this manner, a uniform distribution of chlorine gas 16 within the chlorine distribution chamber 38 is achieved. The chlorine distribution plate 52 is a plate sufficiently thin to prevent the puddling of liquid within a plurality of holes 54 within the distribution plate 52. Preferably, impingement plates 56 are disposed in front of each hole 54 within the chlorine distribution plate 52 to further minimize the back flow of liquid from the falling droplet zone 36 into the chlorine distribution chamber 38 and to cause the lateral flow of chlorine 16 into the falling droplet zone 36 to spread through the falling droplet zone 36 in a highly uniform manner.

By this configuration of the chlorine distribution equipment, liquid from the falling droplet zone 36 is largely prevented from splashing backward into the chlorine distribution chamber 38 and the holes 54 within the chlorine distribution plate 52 do not allow the "puddling" of splashed liquid. To the extent that any liquid does form in the chlorine distribution chamber 38, a drain 58 is provided at the base of the chlorine distribution chamber 38 to remove and dispose of the liquid. Thus, all liquid carry-over with the flow of chlorine 32 into the falling droplet zone 36 is effectively prevented.

Figure 6:
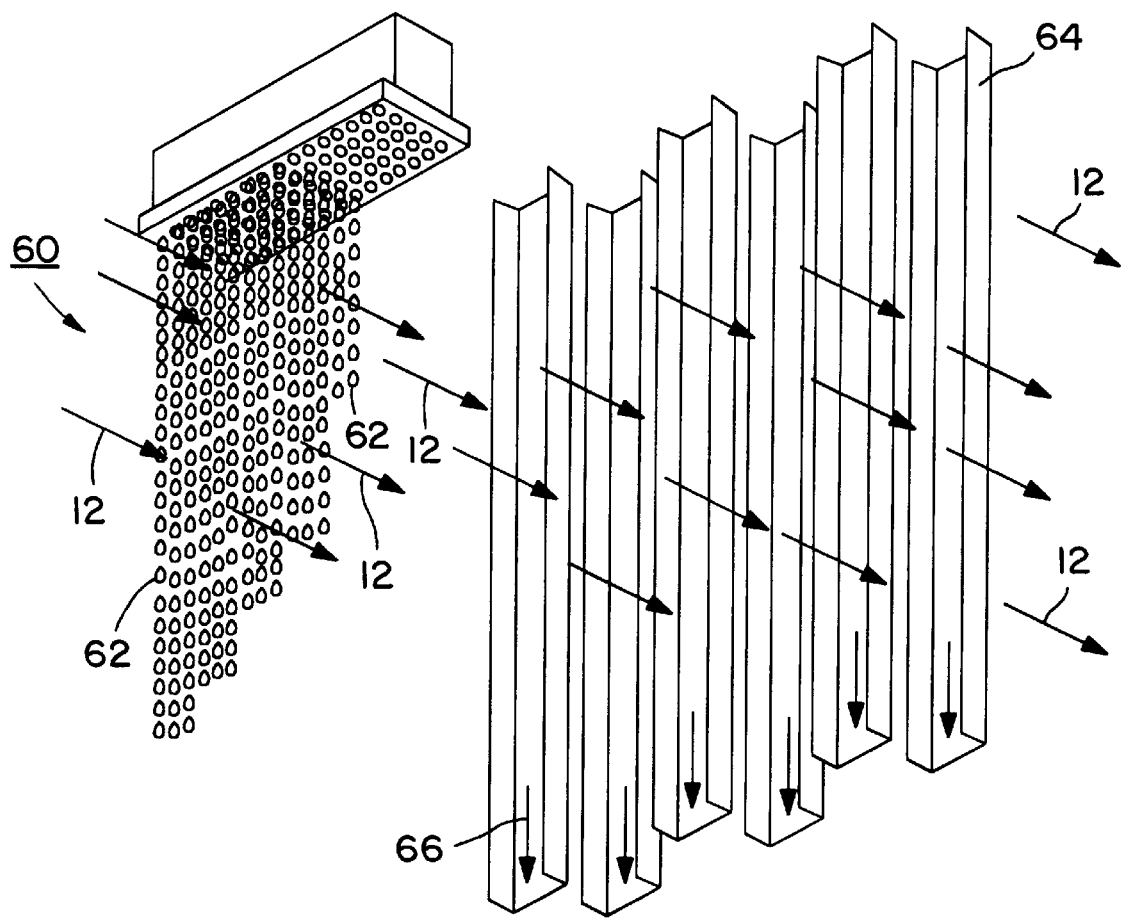
FIG. 6 is a perspective detail view of a water trap and impingement baffle combination useable in the singlet-delta oxygen generator illustrated in FIG. 2.

In another preferred embodiment of a singlet-delta oxygen generator 14 useable in the invention, the generator 14 further comprises a water vapor trap 60 which removes water vapor from the flow of singlet-delta oxygen 12. As shown in FIGS. 2 and 6, a preferred embodiment of such a water trap 60 comprises the contacting of the flow stream containing the singlet-delta oxygen molecules 12 with droplets of liquid hydrogen peroxide 62 which has been chilled to temperatures below about −20° C., preferably below about −30° F. or lower. Such a water trap 60 is described in detail in co-pending U.S. patent application Ser. No. 08/890, 717 (entitled "Water Vapor Trap and Liquid Separator for Singlet Oxygen Generator," now pending, filed concurrently herewith and incorporated herein in its entirety by this reference).

As shown in detail in FIG. 6, in a still further preferred embodiment, the singlet-delta oxygen generator 14 comprises a series of vertical flow baffles 64 disposed within the path of the stream of singlet-delta oxygen molecules 12 downstream of the water trap 60. By the use of such flow baffles 64, entrained liquid droplets 66 within the stream of singlet-delta oxygen 12 are removed to the bottom of the singlet-delta oxygen generator 14.

At the bottom of the singlet-delta oxygen generator 14, a chilled hydrogen peroxide retaining sump 68 is disposed to catch chilled hydrogen peroxide from the water trap 60. From the hydrogen peroxide retaining sump 68, the hydrogen peroxide is recycled via a water trap recycle pump 70, chilled in a water trap heat exchanger 72 and delivered anew to a droplet generator 74 disposed at the top of the singlet-delta oxygen generator 14.

In preferred embodiments of the invention, all pumps in the COIL are gas turbine pumps ("turbo pumps"), driven by jet fuel combustion products. The use of such turbo pumps in the invention further minimizes the weight requirement of the invention. However, in using turbo pumps for the recycling of hydrogen peroxide, care must be taken to minimize the generation of hydrogen peroxide bubbles within the recycled hydrogen peroxide stream. Use of pump impellers designed to provide minimum shearing of the pump liquid is therefore preferred.

It is also preferable in the invention that the basic hydrogen peroxide recycle heat exchanger 46 and the water trap heat exchanger 72 use flashing ammonium as the cooling agent. Use of flashing ammonia provides a high degree of cooling with minimum weight requirements. Liquid ammonia is stored within the aircraft, is flashed to provide cooling with the heat exchangers and is then expelled to the atmosphere. No cumbersome refrigerant recycle equipment is necessary.

In the invention, singlet-delta oxygen 12 generated in a singlet-delta oxygen generator 14 is delivered to the photon generating chamber 22 where it is contacted with gaseous iodine 20 to produce electronically excited iodine. In a typical embodiment of the invention, the mixing of the single-delta oxygen 12 and the gaseous iodine 20 is carried out in chemical reactant mixing nozzles 78 disposed at the inlet to the photon generating chamber 22. To further minimize the weight of the chemical laser 10 of the invention, such chemical reactant mixing nozzles 78 are made from a plastic material, such as a thermoplastic or high-temperature fiberglass resin, which is substantially resistant to chemical and erosive attack at reactant mixing conditions. In one preferred embodiment of such reactant mixing nozzles 78, the plastic is polyetherimide. Such preferred chemical reactant mixing nozzles are described in detail in co-pending U.S. patent application Ser. No. 08/890,716 (entitled "Gain Generator for High-Energy Chemical Laser," filed concurrently herewith and incorporated herein in its entirety by this reference), now U.S. Pat. No. 5,870,422. An additional advantage of using plastic mixing nozzles 78 is that expensive and weighty heating equipment is not required to prevent solidification of incoming reactant iodine gas_. Plastic mixing nozzles have been found to have sufficient thermal insulation capability to prevent the precipitation of iodine gas at the mixing nozzles 78. A shallow skin layer of blades 82 made from polyetherimide, for example, reaches a sufficiently high temperature to prevent iodine condensation without additional heating. Moreover, polyetherimide does not catalyze the deactivation of singletdelta oxygen 12, as do mixing nozzles 78 made from certain metallic materials.

Figure 7:
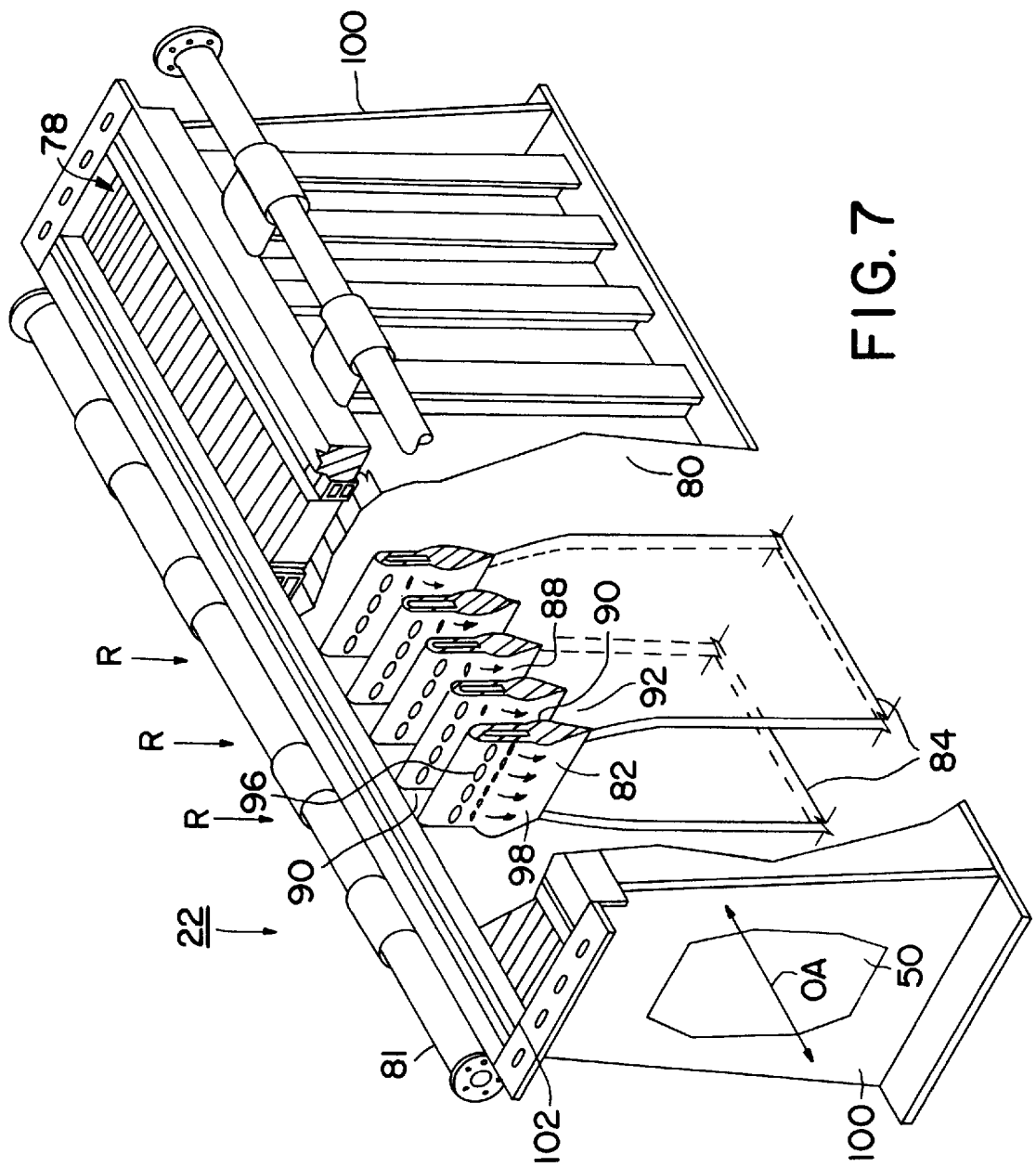
FIG. 7 is a perspective view in partial cross-sectional showing a photon generator useable in a chemical oxygen iodine laser having features of the invention.

FIG. 7 illustrates a photon generating chamber 22 useful in the invention. The photon generating chamber 22 comprises chemical mixing nozzle 78 disposed in a cavity 80 within the photon generating chamber 22 and a chemical reactant supply manifold 81. The nozzle 78 comprises a plurality of blades 82 arranged in a uniformly spaced, parallel relationship and flow shrouds 84 surrounding the blades to confine the flow gas. Adjacent pairs of the blades 82 define nozzle passages 88 extending through the nozzle 78. The nozzle passages 88 include an inlet end 90, an outlet end 92 and an intermediate throat portion 94. Typically, the nozzle 78 includes at least 75 blades 84.

A plurality of holes 96 are formed through the blade wall 98 at opposed sides of the blade 82. Typically, at least several hundred total holes 96, frequently having different diameters, are formed in each blade 82.

The photon generating chamber 22 further includes opposed end walls 100 and opposed open ends 102. The photon generating chamber 22 is approximately trapezoidal in shape, having a narrower width at the outlet end of the nozzle passages 88 than at the opening end 102 through which reaction products 27 exit into the pressure recovery system 28. The end walls 100 define opposed aligned openings 106. An optical axis OA extends through the opening ends 102 approximately perpendicular to the direction of flow R of the chemical reactant flow stream.

The injection of reactant iodine 20 into the photon generating chamber 22 is preferably accomplished at supersonic velocities to expand the distance downstream of the nozzles 78 over which iodine 20 dissociation occurs. This extends the optical mode and reduces the flux level on optical components.

Figure 8:
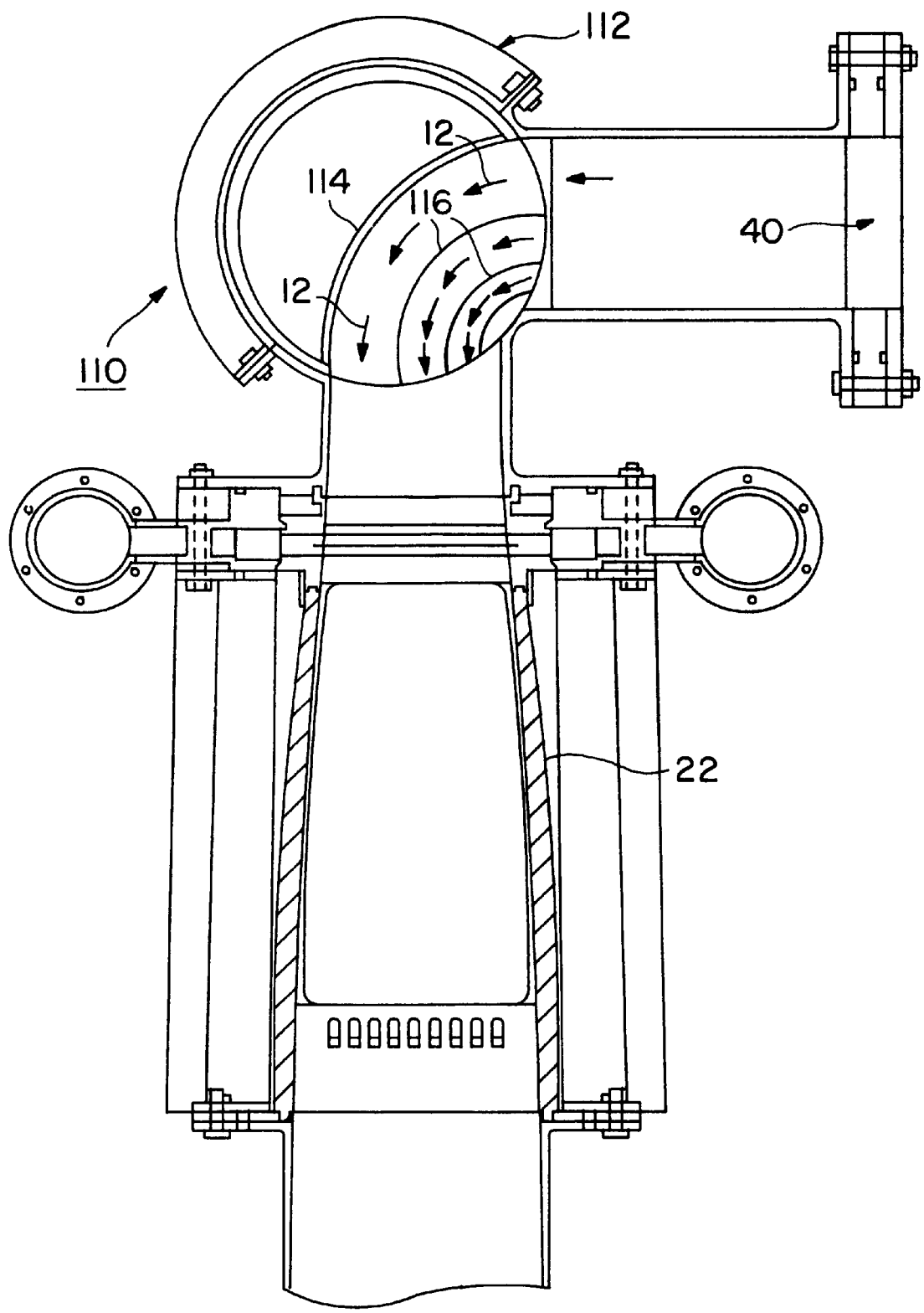
FIG. 8 is a cross-sectional side view of a connection conduit connecting the singlet-delta oxygen generator and photon generator of a chemical oxygen iodine laser having features of the invention.
Figure 11A:
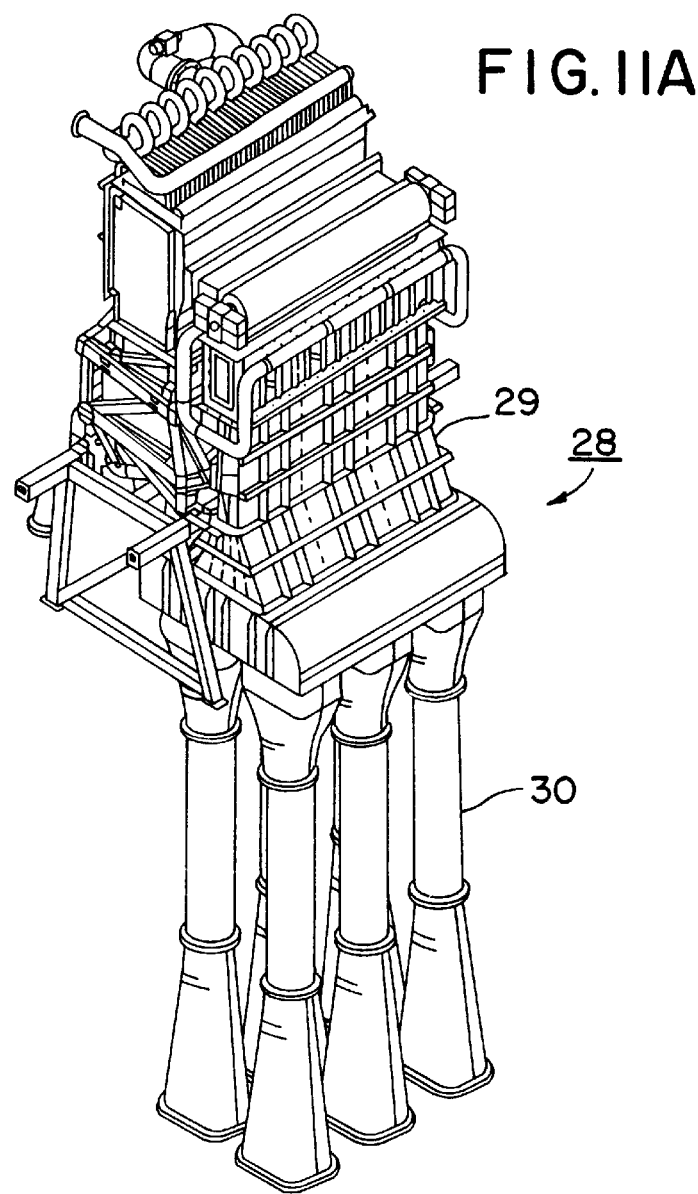
FIG. 11A is a perspective view of a pressure recovery system useable in a chemical oxygen iodine laser having features of the invention.
Figure 11B:
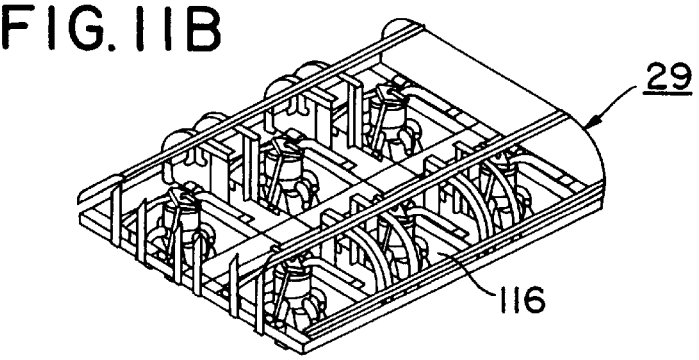
FIG. 11B is a perspective view of the gas generator portion of the pressure recovery system shown in FIG. 11A.

In a COIL 10 such as preferred in the instant invention, the uniform flow of singlet-delta oxygen 12 to the chemical reactant mixing nozzles 78 is critical. In prior art land-based COILS, such uniform distribution of the singlet-delta oxygen 12 was not a significant problem because the singlet-delta oxygen discharge port 40 on the singlet-delta oxygen generator 14 could be aligned in perfect linear fashion with the flow of reactants through the photon generating chamber 22. However, in the confines of an airborne platform, such linear alignment between the singlet-delta oxygen outlet port 40 and the flow of reactants through the photon generating chamber 22 has been found to be impractical for space and length limitations. Accordingly, an angle of between about 60 and about 120° between the flow of singlet-delta oxygen 12 produced in the singlet-delta oxygen generator 14 and the flow of reactants through the photon generating chamber 22 is required. In a typical embodiment such as shown in FIGS. 2 and 8, the angle is about 90°. For reasons of laser beam stabilization control, it has been found preferable that the angle of about 90° should be in a downward direction, so that flow through the photon generating chamber 22 is generally vertically in a downward direction.

To achieve the required uniform singlet-delta oxygen flow distributions required at the inlet to the chemical reactant mixing nozzles 78, a hollow connector 110 is required which maintains the laminar nature of the singlet-delta oxygen flow from the singlet-delta oxygen generator 14. As shown in FIG. 8, a cylindrical isolation valve 112 directs the flow of singlet-delta oxygen 12 around a 90° bend. The valve 112 is installed in a hollow connector 114 which further comprises a plurality of curved internal flow baffles 116.

The COIL process useable in the chemical laser of the invention operates at substantially reduced pressures. Accordingly, reaction products 27 from the photon generating chamber 22 must be drawn out of the chamber 22 and exhausted to the exterior of the airborne platform at ambient pressures. Under typical operating conditions, the pressure differential between the photon generating chamber 22 and ambient pressure can be greater than 0.2 atmospheres, and often greater than 0.3 atmospheres.

To accomplish the withdrawal and exhaustion of the photon generating chamber 22 reaction products 27, a pressure recovery system 28 is employed, such as shown in FIGS. 9–11B and described in greater detail in U.S. patent application Ser. No. 08/890,224 (entitled "High Performance Ejector and Pressure Recovery Method," pending, filed concurrently herewith and incorporated herein in its entirety by this reference).

In a preferred pressure recovery system 28 useable in the invention, the pressure recovery system 28 comprises a plurality of single-stage ejectors 30. In one preferred embodiment, each photon generating module 22 comprises six single stage ejectors 30 operating in parallel.

In the invention, a preferred ejector 30 is composed substantially of a carbon-carbon fiber material to minimize weight requirements. To minimize oxidative degradation of the carbon-carbon fiber material, an antioxidant coating can be used.

To maximize the efficiency of each ejector 30, the primary gas 120 useable in each ejector 30 is a supersonic flow generated from the reaction of decomposed hydrogen peroxide and a hydrocarbon fuel, such as an aircraft or a jet fuel, such as JP-8. The decomposed hydrogen peroxide is hydrogen peroxide generally of 70%–95% purity (by weight), which is catalytically decomposed to water and oxygen at elevated temperatures and pressures. A silver-based screen mesh catalyst can be used for this purpose.

Where the decomposed hydrogen peroxide begins with a hydrogen peroxide of about 85% purity (by weight) or greater, its reaction with an aircraft or jet fuel, such as JP-8, is auto-igniting, thereby eliminating the necessity of ignition equipment.

As shown in FIG. 10, the supersonic flow of the primary gas 120 is generated in a primary gas generator 116 disposed within the plenum 29. The primary gas 120 is then directed towards the throat section 128 of each ejector 30. To minimize thermal degradation of the primary gas generators 116, the primary gas generators 116 can be cooled by a coolant flowing through an external jacket (not shown). To minimize weight requirements and maximize thermal efficiencies, the preferred coolant is the hydrocarbon fuel.

In the inlet section 122 of each ejector 30, reaction products 27 from the photon generating chamber 22 are mixed with the primary gas 120. The combined flow of gases 126 is then transmitted supersonically into the throat 128 of the ejector 30. As the throat 128 of the ejector 30 expands to the outlet section 130 of the ejector 30, flow within the ejector 30 gradually becomes subsonic. Such subsonic flow is then expelled from the airborne platform via exhaust fairings 133 disposed at the bottom of the airborne platform.

By use of multiple single stage ejectors 30, the need for two-stage ejectors (having unacceptably excessive length) is eliminated. The use of carbon-carbon fiber materials minimizes weight requirements and the use of decomposed hydrogen peroxide/hydrocarbon fuel maximizes ejector efficiencies.

As is mentioned above, each of the photon generating modules produces a high-energy photon beam 26 is well-known in chemical lasers, such photon beam is focused transverse to the flow of chemical reactants within the photon generating chamber 22 in the invention, each of the photon beams 26 from each of the photon generating chambers 22 (from each of the photon generating modules 8) is optically connected laterally to form a single ultrahigh energy laser beam 26. Suitable optical equipment generally known in the art is used for this purpose.

Where the laser beam is constructed from multiple banks 134 of individual photon generating modules 8, it is preferable that the laser beam 26 from the upstream bank 134 is inverted prior to its being combined with the laser beam produced in the downstream bank 134. This is because in embodiments of the invention wherein the flow of reactants through the photon generating chamber 22 is downward, the photon energy produced in each photon generating module 8 tends to be of higher intensity near the top of the chamber 22 than at the lower portion of the chamber 22. This is because the reaction rate between the photon generating reactants within the photon generating chamber 22 is greater at the inlet to the chamber 22 than at the outlet. Thus, the photon beam 26 exiting each such photon generating module 8 is higher in intensity at its upper portion than at its lower portion. To equalize the intensity of the resulting combined laser beam, it is therefore preferable that the laser beam 26 produced in the upstream bank 134 be inverted (so that its high energy component is at the lower portion of the beam) prior to its combination with the laser beam 26 from the downstream bank 134. Inversion of the laser beam 26 is carried out by standard optical techniques known in the art.

FIGS. 12 and 13 show a typical combination of the chemical laser 10 of the invention mounted in an airplane 140. The invention shown in FIGS. 12 and 13 comprises two banks 134 of photon generating modules 8, each bank 134 containing seven modules 8. At the rearmost portion of the airplane 140 is shown a main deck entry door 142 and internal tanks for hydrogen peroxide 144 and for JP-8 146, respectively. An aft optical bench 148 is shown immediately to the rear of the photon generating modules 8. A catwalk 150 is disposed between the two banks 134, with a stairway 152 granting access to the catwalk 150.

Also shown at the rearmost end of the airplane 140 is an access hatch 154 for access to the lower portion of the plane 140, an aft compartment door 156 and a side cargo door 158. Also shown immediately below the photon generating modules 8 is the exhaust fairing 133.

Below the two banks of photon generating modules 8 is shown a chlorine vaporizer 160, an inlet scoop 162 and a chlorine tank 164. Immediately forward of the photon generating modules 8 is shown a mid-optical bench 166, helium tanks 168, hydrogen peroxide tanks 169 and ammonia tanks 170.

Forward of the helium and ammonia tanks 168 and 170 is a main deck entry door 172, personnel storage lockers 174, galley 175, equipment storage locker 176, bunks 178 and interlock 180.

Also shown forward of the helium and ammonia tanks 168 and 170 are battle management E/E racks 182 and laser device E/E racks 184.

Also shown is a safe 186, battle management crew stations 188, battle management system equipment racks 190, seats 192, seat tracks 194, and isolation curtain 196, lavatory 197, forward stairs 198, crew entry door 200 and a main deck entry door 202.

A laser beam tube 204 runs from the mid-optical bench 166 through the forward end of the plane 140 to the nose of the plane 206. In the nose of the plane 206 is a beam director turret assembly 208.

Along the laser beam tube 204 is a material window 210. Between the laser beam 204 and the beam director turret assembly 208 is a forward optical bench 212. Also shown in the forward end of the airplane 140 is a beam control system E/E rack 214, body fairing 216, slipway 218, passive flow control device 220, spoiler 222, weather radar 224, and laser device electronic rack 226.

Disposed at the forward end of the aircraft 140 and on the top of the aircraft 140 is a target ranger/typer 228. Immediately behind the beam director turret assembly 208 is a forward material window 230.

Figure 14:
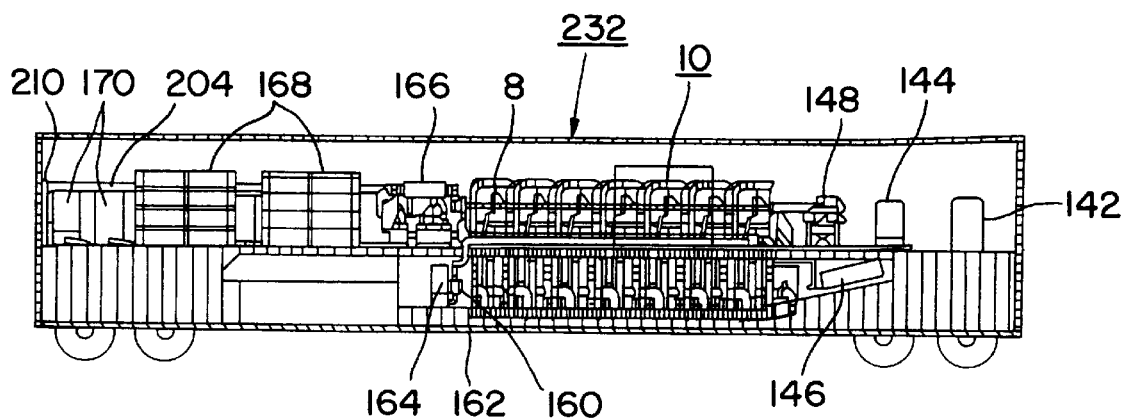
FIG. 14 is a cross-sectional side view of a chemical oxygen iodine laser mounted on a land-based transportation device having features of the invention.

As shown in FIG. 14, the chemical laser 10 of the invention can also be installed in a landbased transportation device 232, such as a truck, trailer, railroad car or similar device.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A high power chemical laser suitable for use in an airborne anti-theater ballistic missile system, the chemical laser being a COIL comprising a bank of two or more individual photon generating modules, each module having a distinct photon generating chamber, wherein all of the photon generating chambers are optically connected so that the total photon output of the chemical laser is the sum of the photon outputs from each of the photon generating modules.

2. The chemical laser of claim 1 comprising two or more banks of photon generating modules, wherein the total photon output from each bank is combined along a path disposed in a single plane so that the total photon output of the chemical laser is the sum of the photon outputs from each of the banks of photon generating modules.

3. The chemical laser of claim 2 comprising a first bank and a second bank, the total photon output from each bank being emitted in the form of a photon beam, and wherein the photon beam emitted from the first bank is inverted and then combined with the photon beam emitted from the second bank.

4. The chemical laser of claim 1 wherein each photon generating module has a singlet-delta oxygen generator and a photon generating chamber and wherein singlet-delta oxygen produced in the singlet-delta oxygen generator is emitted from the singlet-delta oxygen generator above the photon generating chamber and at an angle with respect to the flow of reactants through the photon generating chamber of between about 60 and about 120 degrees.

5. The chemical laser of claim 4 wherein the singlet-delta oxygen generator is fluid tightly connected with the photon generating chamber by a hollow connector which maintains the flow of singlet-delta oxygen therethrough substantially laminar.

6. The chemical laser of claim 5 wherein the hollow connector comprises a plurality of curved internal flow baffles.

7. The chemical laser of claim 4 wherein the singlet-delta oxygen generator produces singlet-delta oxygen from the reaction of chlorine and a solution comprising hydrogen peroxide and at least two different bases in molar ratios to one another of between about 3:1 and about 1:1.

8. The chemical laser of claim 7 wherein the solution comprises sodium hydroxide, potassium hydroxide and lithium hydroxide.

9. The chemical laser of claim 4 wherein the chlorine is provided to the singlet-delta oxygen generator by a chlorine injection manifold having means for preventing the carryover of liquid therefrom.

10. The chemical laser of claim 4 further comprising a water trap which removes water vapor from the singlet-delta oxygen produced in the singlet-delta oxygen generator by contacting a flow stream containing the produced singlet-delta oxygen with droplets of hydrogen peroxide having a temperature below about −20° C.

11. The chemical laser of claim 10 wherein liquid droplets are removed from the flow stream comprising the singlet-delta oxygen produced in the singlet-delta oxygen generator by passing the flow stream containing the produced singlet-delta oxygen into contact with and through a plurality of closely spaced flow baffles disposed downstream of the water vapor trap.

12. The chemical laser of claim 1 wherein at least one liquid stream generated in the chemical laser is pumped with a pump driven by a gas turbine.

13. The chemical laser of claim 12 wherein the liquid pumped with a pump driven by the gas turbine is a hydrogen peroxide stream and the impeller blades on the pump are designed to produce substantially no hydrogen peroxide vapor bubbles.

14. The chemical laser of claim 1 wherein at least one liquid stream generated in the chemical laser is cooled by thermal contact with flashing liquid ammonia.

15. The chemical laser of claim 1 wherein each photon generating module has a photon generating chamber and wherein the photon generating chamber-comprises a plurality of reactant mixing nozzles made from a plastic which is substantially resistant to chemical and erosive attack at reactant mixing conditions.

16. The chemical laser of claim 15 wherein the plastic is polyetherimide.

17. The chemical laser of claim 1 wherein each photon generating module with a pressure recovery system which draws reaction products from the photon generator and wherein the pressure recovery system comprises a plurality of ejectors disposed in parallel.

18. The chemical laser of claim 17 wherein the ejectors are comprised substantially of a carbon-carbon fiber composite material.

19. The chemical laser of claim 17 wherein the number of parallel ejectors is at least four and wherein each ejector is capable of removing reactants from the photon generating chamber and exhausting those reactants to an exhaust zone having a pressure at least about 0.2 atmospheres higher than the pressure within the photon generating chamber.

20. The chemical laser of claim 17 wherein the ejectors are driven by the reaction products of decomposed hydrogen peroxide and jet fuel.

21. The chemical laser of claim 20 wherein the ejectors are driven by the reaction products of decomposed 85% hydrogen peroxide and jet fuel.

22. The chemical laser of claim 1 wherein the chemical laser is installed in an airborne device.

23. The chemical laser of claim 22 wherein the chemical laser is installed in an airplane.

24. The chemical laser of claim 1 wherein the chemical laser is installed in a land-based transportation device.

25. A high power chemical laser installed in an airborne anti-theater ballistic missile system, the chemical laser comprising a bank of two or more individual photon generating modules, each module having a distinct photon generating chamber, wherein all of the photon generating chambers are optically connected so that the total photon output of the chemical laser is the sum of the photon outputs from each of the photon generating modules.

26. The chemical laser of claim 25 wherein the chemical laser is installed in an airplane.

* * * * *